United States Patent [19]
Matsuda

[11] Patent Number: 6,134,756
[45] Date of Patent: Oct. 24, 2000

[54] ELEMENT ROW FOR SLIDE FASTENER AND METHOD AND APPARATUS FOR PRODUCING THE ELEMENT ROW AND MONOFILAMENT MADE OF SYNTHETIC RESIN FOR FORMING THE ELEMENT ROW

[76] Inventor: Yoshio Matsuda, 1898, Uwano, Nyuzen-machi, Shimoniikawa-gun, Toyama-ken, Japan

[21] Appl. No.: 09/316,333

[22] Filed: May 21, 1999

[30] Foreign Application Priority Data

Jun. 1, 1998 [JP] Japan .................................. 10-150835

[51] Int. Cl.$^7$ .............................. A44B 19/12; B29D 5/00
[52] U.S. Cl. .................................. 24/391; 24/394; 24/406
[58] Field of Search .............................. 24/391, 394, 406, 24/399, 400, 401, 404

[56] References Cited

U.S. PATENT DOCUMENTS

| | | | |
|---|---|---|---|
| 3,047,923 | 8/1962 | Wilcken | 24/394 |
| 3,199,162 | 8/1965 | Sohr et al. | 24/391 |
| 3,336,640 | 8/1967 | Chery | 24/391 |
| 3,855,672 | 12/1974 | Takamatsu | 24/391 |
| 3,908,242 | 9/1975 | Reynolds . | |
| 4,989,300 | 2/1991 | Fukuroi | 24/391 |
| 5,058,246 | 10/1991 | Fujisaki et al. | 24/391 |
| 5,119,534 | 6/1992 | Fujisaki et al. | 24/394 |
| 5,167,051 | 12/1992 | Kousaka . | |

FOREIGN PATENT DOCUMENTS

| | | |
|---|---|---|
| 0 437 802 | 7/1991 | European Pat. Off. . |
| 0 449 163 | 10/1991 | European Pat. Off. . |
| 0 465 960 | 1/1992 | European Pat. Off. . |

*Primary Examiner*—Victor N. Sakran

[57] ABSTRACT

An element row for a slide fastener made by stamping a monofilament made of synthetic resin. Element coupling heads have a shape which enables the elements to be reliably coupled with each other even though the gaps between upper and lower leg portions of the elements are small. Each coupling head has flat sectional portions extending from center portions of one of the ends of the upper and lower leg portions toward each other, and the flat sectional portions have increasing widths. A coupling portion of the element head is sandwiched between both the flat sectional portions, is thinner than the flat sectional portions, and has tip end portions projecting toward opposite sides in the longitudinal direction of the element row. The coupling portion is reliably engaged in a small gap formed between the coupling heads and the upper and lower leg portions of adjacent elements of a mating element row. An apparatus and method for making the element row is also disclosed.

7 Claims, 5 Drawing Sheets

ELEMENT ROW FOR SLIDE FASTENER AND METHOD AND APPARATUS FOR PRODUCING THE ELEMENT ROW AND MONOFILAMENT MADE OF SYNTHETIC RESIN FOR FORMING THE ELEMENT ROW

BACKGROUND OF THE INVENTION

1. Field of the Invention

The present invention relates to a continuous element row for a slide fastener in which the element row being obtained by stamping a monofilament made of synthetic resin by using stamping rollers, and a method and an apparatus for producing the element row.

2. Description of the Related Art

Usage of this type of slide fastener has been further diversified in recent years, and the slide fastener has been frequently used not only for thin outerwear but also for extremely thin underwear in addition to conventional various bags, clothes, or industrial sheet material. Therefore, size and configuration of the elements are diversified and rigidity of the elements are also diversified.

This type of continuous elements obtained from the monofilament made of synthetic resin basically comprises coupling heads to be coupled with a mating element, a pair of upper and lower leg portions bent to extend from each coupling head, and connecting portions for connecting the upper and lower leg portions of adjacent element. Usually, each coupling head has at opposite sides thereof bulging portions, in a longitudinal direction of the element row, and the bulging portions enter gap portions between the upper and lower leg portions of the mating element to couple each other when the element row is coupled with the mating element row.

A coupling head is generally shaped by pressing a coupling portion of the monofilament made of synthetic resin with a pressing jig having a projecting streak so as to plastically deform the monofilament such that the monofilament is partially flattened, thereby forming the bulging portions at left and right portions of the monofilament. In a state wherein the element is bent to be attached to a fastener tape, a vertical sectional shape of the coupling head to the fastener tape is approximately an ellipse which is elongated vertically. If the gap between the upper and lower leg portions is large, the bulging portions of each coupling head can easily enter the gap, thereby enabling the element rows to be coupled with each other.

However, for the slide fastener described above, it has been desired that the fastener element be made thinner in order to improve touch and appearance. Therefore, in order to decrease heights of the elements projecting from the fastener tape face, the upper and lower leg portions of the elements are attached substantially in close contact with each other and in a state wherein the leg portions are regularly ordered. As a result, sufficient gaps can not be formed between the upper and lower leg portions, and the bulging portions of the coupling heads can not sufficiently enter the gaps. Therefore, necessary coupling function after the coupling can not be obtained in many cases.

If the bulging portions are formed smaller, particularly when the slide fastener is curved to project toward the element side, or when the slide fastener is twisted along a longitudinal direction, the slide fastener can not bear variation of pitches between the elements, and thus a coupling tends to split.

SUMMARY OF THE INVENTION

The present invention has been developed to solve the above problems, it is an object of the invention to provide a thin slide fastener element row and a method and an apparatus for producing the element row wherein the element row is obtained by stamping a monofilament made of synthetic resin and having upper and lower leg portions with small gaps therebetween, and coupling heads are formed into rational coupling shapes thereby enabling the element row and a mating element row to be reliably coupled with each other even if the gaps between the upper and lower leg portions are small, and the element row has excellent durability and a sufficient coupling function.

The above object is achieved by the following first to third aspects of the present invention.

According to the first aspect of the invention, there is provided a continuous element row for a slide fastener comprising an element row formed of a monofilament made of synthetic resin, at least coupling heads are formed by stamping a stamping rollers and having upper and lower leg portions continuously extending from upper and lower portions of the coupling heads, and connecting portions for connecting the leg portions of adjacent elements, wherein the coupling head has flat sectional portions respectively extending from center portions of one ends of the upper and lower leg portions toward each other with widths increasing in an longitudinal direction of the elements and coupling portions which are sandwiched between both the flat sectional portions, extending along opposed end edges of the flat sectional portions, thinner than the flat sectional portions, and have tip end portions projecting toward opposite sides in the longitudinal direction of the element row, and each coupling portion is engaged in a small gap formed between the coupling heads and the upper and lower leg portions of the adjacent elements of a mating element row in a state that the upper and lower leg portions of the element row are fixed to fastener tape in close contact with each other.

Because the coupling head has a peculiar shape and particularly has the coupling portions with the tip ends thereof projecting from the flat sectional portions toward the opposite sides in the longitudinal direction of the element row, when the element row is coupled with a mating element row, each tip ends of the coupling portion deeply enters the gap formed between the upper and lower leg portions of the mating element row even if the gap between the upper and lower leg portions is small. Therefore, a sufficient coupling is achieved and a coupling strength is increased, a coupling split can be prevented.

According to the second aspect of the invention, there is provided a method for producing a continuous element row for a slide fastener wherein a monofilament made of synthetic resin and supplied continuously is defined at least engaging heads of the slide fastener element stamped by a pair of stamping rollers in a longitudinal direction of the monofilament at predetermined intervals, comprising the steps of forming coupling head shaping portions at portions of opposed peripheral faces of the pair of stamping rollers, the coupling head shaping portions having first flat sectional portion shaping portions bulging in diameter directions and extending in axial directions, coupling portion shaping portions connected to the first flat sectional portion shaping portions and projecting into rib shapes in the diameter direction further than the first flat sectional portion shaping portions, and second flat sectional portion shaping portions connected to the coupling portion shaping portions and having shapes axisymmetric to the first flat sectional portion shaping portions, disposing the pair of stamping rollers with one upon another, with predetermined gap between the stamping rollers and with shafts of the stamping rollers in parallel to each other; driving each the stamping roller synchronously with each other; and continuously introducing the monofilament made of the synthetic resin between each the stamping roller.

According to the third aspect of the invention, there is provided an apparatus for producing a continuous element for a slide fastener wherein a monofilament made of synthetic resin and supplied continuously is defined at least engaging heads of the slide fastener element stamped by a pair of stamping rollers in a longitudinal direction of the monofilament at predetermined intervals, comprising a pair of the stamping rollers disposed with one upon another with predetermined gap between the stamping rollers and with shafts of the stamping rollers in parallel to each other; and rotating driving means for driving each the stamping roller synchronously with each other, wherein the pair of stamping rollers have the same shapes, engaging head shaping portions having the same shapes are formed to project from portions of peripheral faces of each the stamping roller, the engaging head shaping portions having first flat sectional portion shaping portions formed to project from portions of the opposed peripheral faces of the pair of stamping rollers, bulging in diameter directions, and extending in axial directions, coupling portion shaping portions connected to the first flat sectional portion shaping portions and projecting into rib shapes in the diameter directions further than the first flat sectional portion shaping portions and second flat sectional portion shaping portions connected to the coupling portion shaping portions and having shapes axisymmetric to the first flat sectional portion shaping portions. By the apparatus according to the third aspect having the above structure, the fastener element row of the first aspect can be efficiently and continuously produced.

According to the fourth aspect of the invention, there is provided a monofilament made of synthetic resin for slide fastener elements wherein the monofilament is defined with coupling heads stamped by a pair of stamping rollers in a longitudinal direction of the monofilament at predetermined pitches, the coupling heads including, the flat sectional portions extending at both sides in a vertical direction of the monofilament, the coupling portions which are at the center portions of the longitudinal direction of the monofilament, further extending in both directions in the vertical direction of the monofilament and thinner than the flat sectional portions.

By bending the coupling heads having the above shape and the connecting portions of monofilament which are formed between the upper and lower leg portions which are adjacent to each other, a coil-shaped slide fastener element row is formed. A front shape of each the coupling head is substantially in a shape of a rhomb which is long in an longitudinal direction of the element row. The flat sectional portions each extend from one ends of the upper and lower leg portions toward each other with their widths increasing. At a portion where both the flat sectional portions are connected to each other, the coupling portion is defined to extend along the opposed end edges, the coupling portion being thinner than the flat sectional portions. Tip end portions of the coupling portion project from the flat sectional portions toward opposite sides in the longitudinal direction of the element row. Thus forming the element row of the first aspect.

DESCRIPTION OF THE PREFERRED EMBODIMENTS

Figure 1:
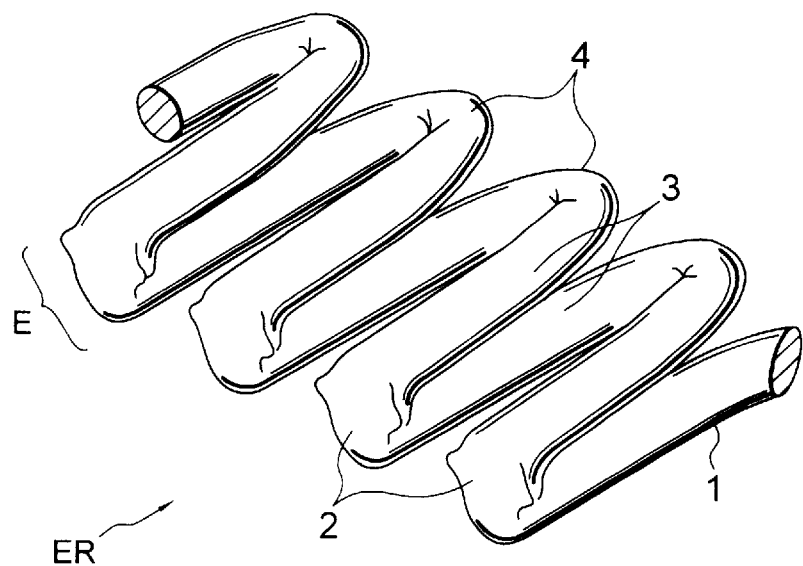
FIG. 1 is a perspective view of a portion of a representative configuration of a continuous element row of the present invention.

Preferred embodiments of the present invention will be specifically described below based on the embodiments shown in the drawings.

FIG. 1 shows an example of a configuration of a representative embodiment of the invention, wherein a monofilament is bent into a coil shape according to a general process after shaping coupling portions on the monofilament. A continuous element row for a slide fastener according to the invention obtained from a monofilament made of synthetic resin is not limited to the above coil-shaped element, but may be a continuous element row bent into a zigzag shape, for example.

Figure 2:
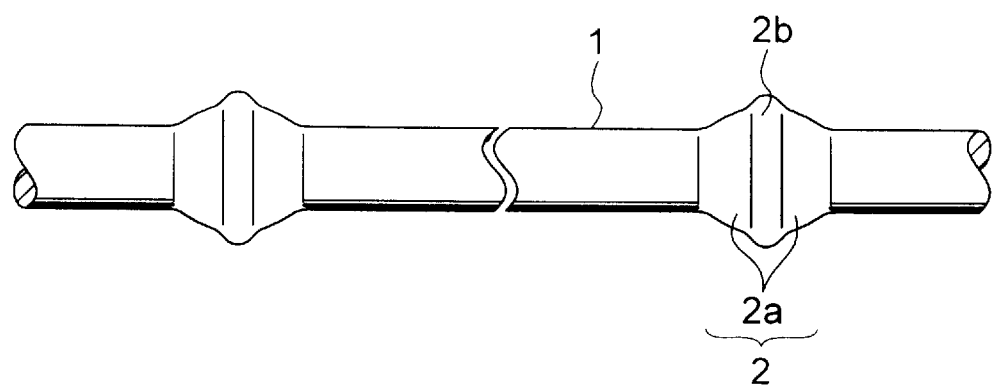
FIG. 2 is a top view schematically showing a configuration of the element row before bending.
Figure 3:
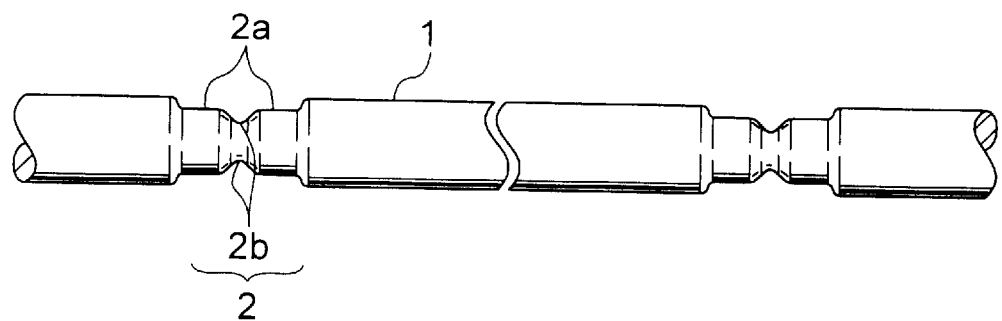
FIG. 3 is a side view of the element row in FIG. 2.

FIG. 2 is a top view schematically showing a configuration of the coil-shaped element before bending, and FIG. 3 is a side view of the element shown in FIG. 2. There are some exaggeration in these drawings so as to facilitate understanding of characteristic portions of the invention. The continuous element row ER according to the embodiment is formed with coupling heads 2 having a configuration as shown in FIGS. 2 and 3 by partially pressing the most general monofilament 1 having a circular sectional shape and made of synthetic resin with a predetermined pitch in a longitudinal direction by using a stamping jig. The pitch is determined according to a length required for a single element portion E. As material of the monofilament 1, thermoplastic synthetic resin material such as polyamide, polyester, polypropylene, and the like is used, and the sectional shape of the monofilament 1 is not limited to a circle but may be an ellipse or a rectangle.

An apparatus of the invention will be specifically described below based on the embodiments shown in the drawings.

Figure 4:
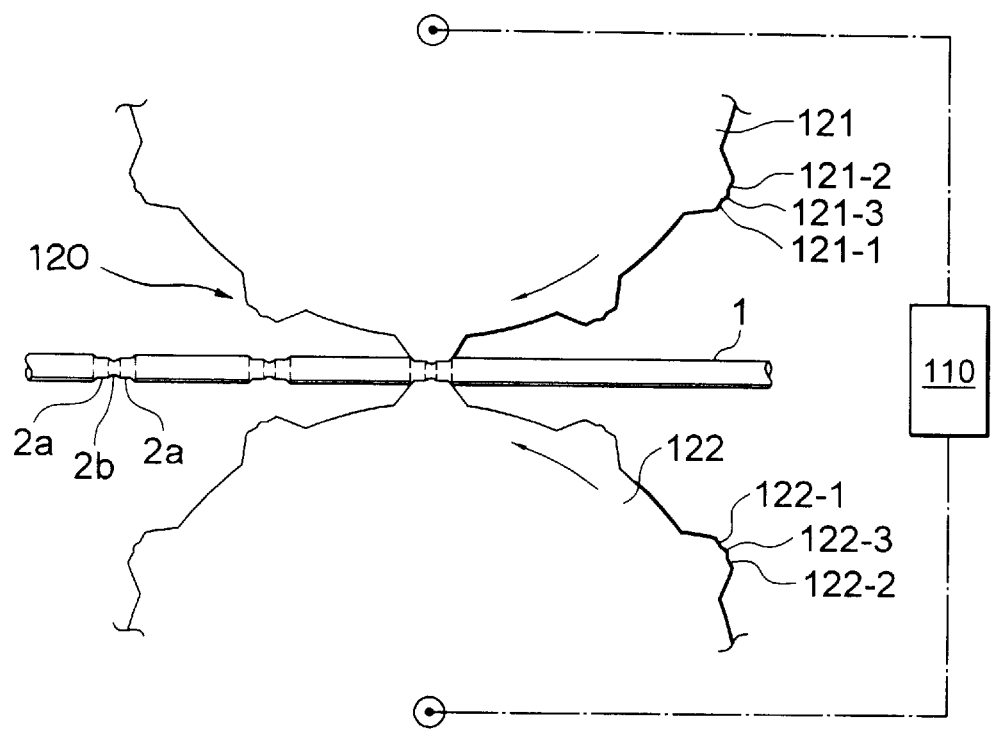
FIG. 4 is a side view partially showing an example of a schematic structure of an apparatus for producing the continuous element row of the invention.
Figure 5:
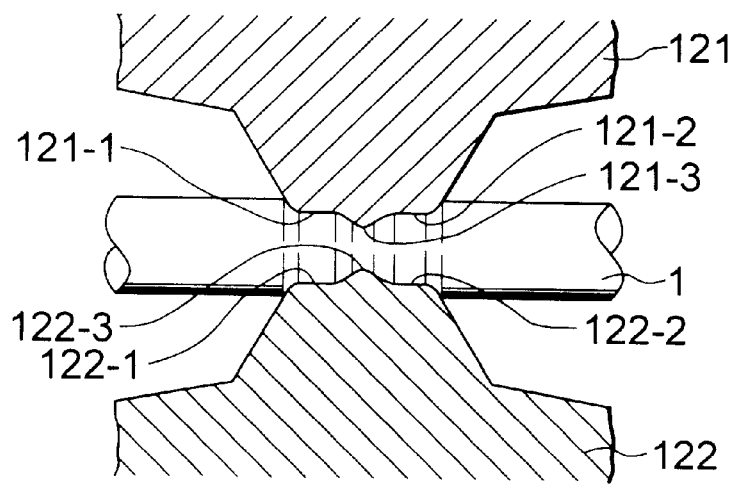
FIG. 5 is a side sectional enlarged view of a stamping portion of the apparatus.

FIG. 4 shows a portion of a stamping portion 120 of the continuous element producing apparatus of the invention, and FIG. 5 is an enlarged view of an essential portion of FIG. 4. In this embodiment, the stamping portion 120 comprises a pair of upper and lower stamping rollers 121 and 122, and each the stamping roller 121 and 122 is driven to rotate synchronously with each other and in opposite directions by a rotation driving source 110 through a transmission mechanism (not shown). Each of the stamping roller 121 and 122 is defined on a peripheral face thereof with a predetermined number of pressing projections formed to project at predetermined intervals, the pressing projections on the peripheral face of the stamping rollers 121 and 122 correspond to each other and have the same shapes. The stamping rollers 121 and 122 are disposed in parallel to the axial direction.

If the monofilament 1 is supplied from a monofilament supply portion (not shown) between the pair of upper and lower stamping rollers 121 and 122 which are rotating in opposite directions to each other, upper and lower faces of the monofilament 1 are pressed by the above pressing projections, thereby successively producing coupling heads 2 by the stamping.

The above producing apparatus of the continuous element for the slide fastener material of which is monofilament 1 made of synthetic resin according to the invention is best characterized by the shape of the above pressing projections which are coupling head shaping portions of the above each stamping roller 121 and 122. Each of pressing projections of a pair of stamping rollers 121 and 122 has the same shape and the opposed peripheral faces of the stamping rollers 121 and 122 are defined with the pressing projections which are a plurality of coupling head shaping portions at predetermined intervals in peripheral directions.

The pressing projections of the invention comprise first flat sectional portion shaping portions 121-1 and 122-1 each bulging in diameter directions of the stamping rollers 121 and 122 and extending in parallel to axial directions of the stamping rollers 121 and 122, coupling portion shaping portions 121-3 and 122-3 connected to the first flat sectional portion shaping portions 121-1 and 122-1 and projecting further than the first flat sectional portion shaping portions 121-1 and 121-1 in rib shapes in the diameter directions, second flat sectional portion shaping portions 121-2 and 122-2 bulging from the stamping roller peripheral faces and having shapes axisymmetric to shapes of the first flat sectional portion shaping portions 121-1 and 122-1.

Projecting shapes excluding the coupling portion shaping portions 121-3 and 122-3 defined between the first flat sectional portion shaping portions 121-1 and 122-1 and the second flat sectional portion shaping portions 121-2 and 122-2 and projecting in the diameter directions in the rib shapes are no more than shapes conventionally and generally used. According to the pressing projections of the invention comprising the first flat sectional portion shaping portions 121-1 and 122-1, the second flat sectional portion shaping portions 121-2 and 122-2, and the coupling portion shaping portions 121-3 and 122-3, the monofilament 1 stamped by the characteristic projecting shapes is provided with long and narrow coupling portions 2b stamped to be flatter than sectional shapes of flat portions 2a at both the upper and lower faces of the monofilament 1 perpendicular to a longitudinal direction of the monofilament at center portions of the flat portions 2a as shown in FIGS. 2 and 3, in addition to coupling head shapes obtained by normal stamping and having flat sectional shapes which approximate to ellipses. Tip ends of the coupling portions 2b project slightly outward from the divided left and right flat portions 2a.

Figure 6:
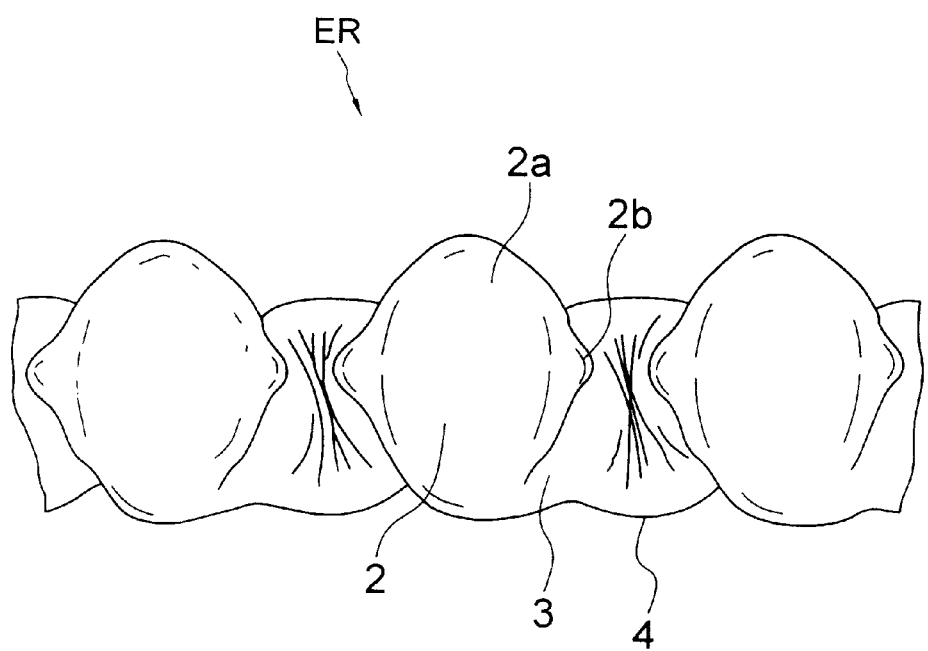
FIG. 6 is a front view of the fastener element row of the invention seen from a coupling head side.

By bending the coupling heads 2 of the monofilament 1 having the above shape and connecting each pair of upper and lower leg portions 3, 3 superposed with one upon another and substantially in parallel to each other with a connecting portion 4 formed by bending a portion between the upper and lower leg portions 3, 3 which are adjacent to each other, a coil-shaped slide fastener element row ER as shown in FIG. 1, for example is formed. A front shape of each the coupling head 2 is substantially in a shape of a rhomb which is long in an longitudinal direction of the element row as shown in an enlarged view in FIG. 6. The flat sectional portions 2a, 2a each extend from one ends of the upper and lower leg portions 3 toward each other with their widths increasing. At a portion where both the flat sectional portions 2a, 2a are connected to each other, the coupling portion 2b is defined to extend along the opposed end edges, the coupling portion 2b being thinner than the flat sectional portions 2a, 2a. Tip end portions of the coupling portion 2b project from the flat sectional portions 2a, 2a toward opposite sides in the longitudinal direction of the element row.

The shape of the coupling head 2 is resulted from the flat sectional portions 2a stamped by the first flat sectional portion shaping portions 121-1 and 122-1 and the second flat sectional portion shaping portions 121-2 and 122-2 and the coupling portion 2b stamped by the coupling portion shaping portions 121-3 and 122-3, the first flat sectional portion shaping portions 121-1 and 122-1, the second flat sectional portion shaping portions 121-2 and 122-2, and the coupling portion shaping portions 121-3 and 122-3 being formed on the pair of opposed stamping rollers 121 and 122. Particularly, because the coupling portion 2b is thinner than the flat sectional portions 2a and the tip ends of the coupling portion 2b slightly project from the flat sectional portions 2a toward the opposite sides in the longitudinal direction of the element row ER, if the continuous element row ER is shaped by bending as described above, the thinnest coupling portion 2b projects clearly from the flat sectional portions 2a.

The pressing projections having the same shapes are formed to project from both the opposed peripheral faces of the stamping rollers 121 and 122 in the apparatus of the above embodiment, but it is also possible that only one of the peripheral face of the pair of stamping rollers 121 and 122 is defined with the pressing projections and the other peripheral face is a flat face.

Figure 7:
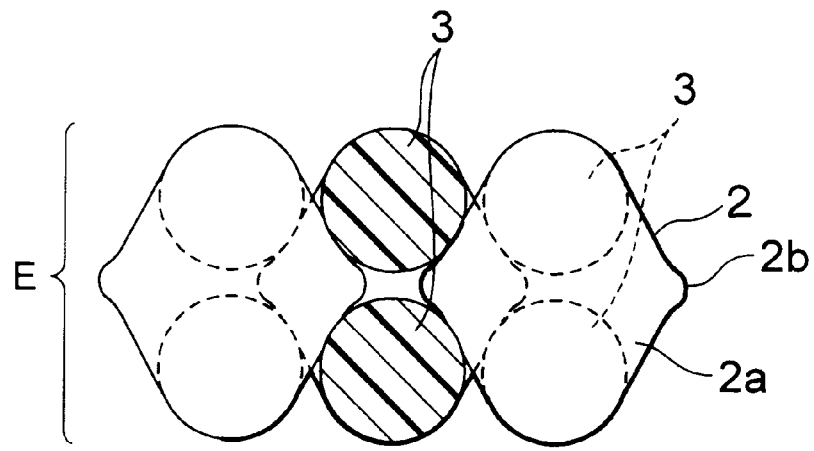
FIG. 7 is a front view of the fastener element row of the invention in a coupled state and seen from the coupling head side with a portion of the element row being shown in section.

The slide fastener wherein the monofilament 1 which is stamped as described above is bent by various conventionally known bending processings to form the continuous element row ER and the continuous element row ER is attached along one side of the fastener tape, for example, in the slide fastener comprising a fastener chain wherein the monofilament 1 is woven or knitted into the tape simultaneously with weaving or knitting of the tape, the upper and lower leg portions 3 of each element portion E are woven or knitted in parallel to each other and closely superposed on each other. If the element portions E of the continuous element row ER arranged in parallel at left and right to face each other are coupled, the coupling was not sufficient with the shape of the conventional coupling head. However, as shown in FIG. 7, extremely thin and narrow projecting tip ends of the coupling portion 2b enter deeply into small gaps formed between the upper and lower leg portions 3, thereby enabling the element rows to be sufficiently coupled with each other.

The above coupling form not only facilitates smooth sliding of the slider but also increases various coupling functions, i.e., coupling strengths, coupling split can be prevented reliably and the like. The coupling strength of the fastener element according to the invention is higher than a coupling strength of the conventional fastener element having coupling heads simply in ellipse shapes by as much as 20%. Even when a force was applied to a rear face of the slide fastener so as to project the element row ER upward into a projecting shape, or even when the slide fastener was strongly twisted in the longitudinal direction of the fastener, the coupling did not split.

The shape of the fastener chain is not limited to the above-described shape. If the fastener chain is in such a shape wherein the upper and lower leg portions are close to each other, even if the fastener chain is sewn on one side edge of the fastener tape, the fastener chain has similar operations and effects.

Figure 8:
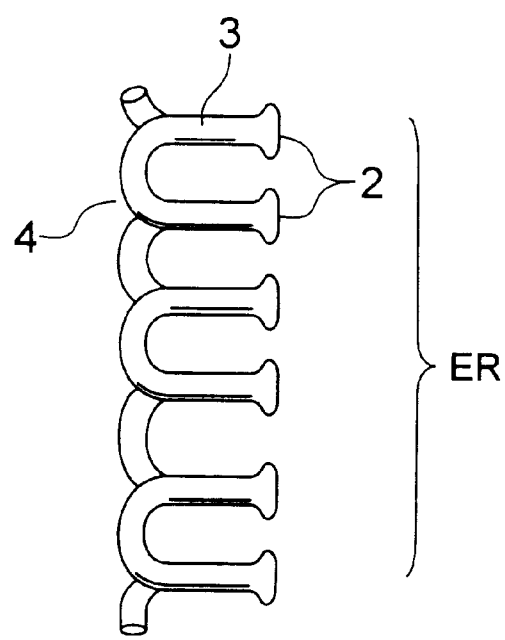
FIG. 8 is a configurational view of a zigzag continuous element row of another embodiment of the invention.
Figure 9:
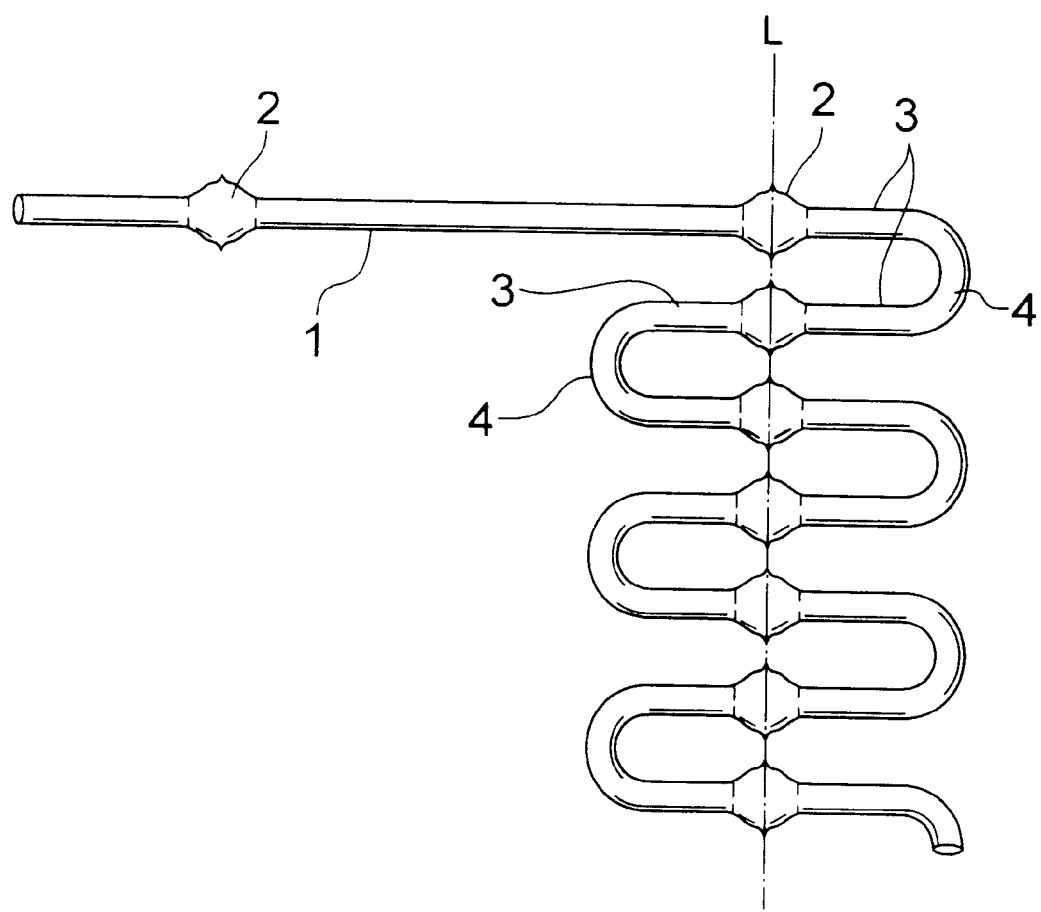
FIG. 9 is a configurational view of the zigzag continuous element row in a first bending processing after stamping.

The monofilament having a circular shape in section is used in the embodiment shown in the drawings, but the monofilament having an ellipse or a rectangular shape in section maybe also used. In case of the monofilament with such different sectional shape, a vertical thickness of the fastener element row ER can be also decreased. Therefore, even if the slide fastener is applied to thin clothes such as underwear, an attached form of the fastener is inconspicuous, and the slide fastener has flexibility. As a structure of a preferred continuous element row ER formed of the monofilament with the different sectional shape, there is a zigzag element row ER shown in FIG. 8. The zigzag element row ER shown in FIG. 8 is formed by shaping coupling portions 2*b* on monofilament 1*b*, bending the monofilament lb into a zigzag shape, and then bending opposite end portions of the coupling portions 2 at a center row L of the coupling portions 2 as shown in FIG. 9.

What is claimed:

1. A continuous element row for a slide fastener comprising:

a plurality of elements, each element having a coupling head and upper and lower leg portions continuously extending from upper and lower portions of the coupling head; and connecting portions connected to the leg portions of adjacent elements, wherein each coupling head has flat sectional portions each extending from an end of one of the upper and lower leg portions toward each other and having an increasing width in a longitudinal direction of the element row, each coupling head having a coupling portion connected to both of the flat sectional portions, the coupling portion being thinner than each one of the flat sectional portions, and having tip end portions projecting from opposite sides in the longitudinal direction of the element row.

2. The continuous element row for a slide fastener of claim 1, wherein each tip portion of each coupling portion is engaged in a small gap formed between the coupling head and the upper and lower leg portions of an adjacent element of a mating slide continuous element row when the element row is fixed to a fastener tape.

3. The continuous element row for a slide fastener of claim 1 wherein the coupling portion has a steeper angle of inclination relative to the longitudinal direction of the element row on its outer surface than an angle of inclination of the flat sectional portion relative to the longitudinal direction of the element row on its outer surface.

4. A monofilament made of synthetic resin for slide fastener elements wherein the monofilament has coupling heads along the monofilament at predetermined pitches, each coupling head comprising flat sectional portions extending at opposed sides of the coupling head in a vertical direction of the monofilament, a coupling portion between and connected to the flat sectional portions and extending in vertical direction of the monofilament, the coupling portion being thinner than each of the flat sectional portions.

5. The monofilament made of synthetic resin for slide fastener elements of claim 4, wherein the coupling portion has a steeper angle of inclination relative to a longitudinal direction of the monofilament on its outer surface than an angle of inclination of the flat sectional portion relative to the longitudinal direction of the monofilament on its outer surface.

6. A method for producing a continuous element row for a slide fastener wherein a monofilament made of synthetic resin and supplied continuously is defined at least coupling heads of the slide fastener element row stamped by a pair of stamping rollers in a longitudinal direction of the monofilament at predetermined intervals, comprising the steps of forming coupling head shaping portions at portions of opposed peripheral faces of the pair of stamping rollers, the coupling head shaping portion having first flat sectional portion shaping portions bulging in diameter directions and extending in axial directions, coupling portion shaping portions connected to the first flat sectional portion shaping portions and projecting into rib shapes in the diameter directions further than the first flat sectional portion shaping portions, and second flat sectional portion shaping portions connected to the coupling portion shaping portions and having shapes axisymmetric to the first flat sectional portion shaping portions, disposing the pair of stamping rollers with one upon another, with predetermined gap between the stamping rollers and with shafts of the stamping rollers in parallel to each other;

driving each the stamping roller synchronously with each other; and continuously introducing the monofilament made of the synthetic resin between each the stamping roller.

7. An apparatus for producing a continuous element row for a slide fastener wherein a monofilament made of synthetic resin and supplied continuously is defined at least coupling heads of the slide fastener element row stamped by a pair of stamping rollers in a longitudinal direction of the monofilament at predetermined intervals, comprising a pair of the stamping rollers disposed with one upon another with predetermined gap between the stamping rollers and with shafts of the stamping rollers in parallel to each other and rotating driving means for driving each the stamping roller synchronously with each other, wherein the pair of stamping rollers have the same shapes, engaging head shaping portions having the same shapes are formed to project from one portions of peripheral faces of each the stamping roller, the engaging head shaping portions having first flat sectional portion shaping portions formed to project from portions of the opposed peripheral faces of the pair of stamping rollers, bulging in diameter directions, and extending in axial directions, coupling portion shaping portions connected to the first flat sectional portion shaping portions and projecting into rib shapes in the diameter directions further than the first flat sectional portion shaping portions, and second flat sectional portion shaping portions connected to the coupling portion shaping portions and having shapes axisymmetric to the first flat sectional portion shaping portions.

\* \* \* \* \*